US008676848B2

(12) United States Patent
Balani et al.

(10) Patent No.: US 8,676,848 B2
(45) Date of Patent: Mar. 18, 2014

(54) CONFIGURING CLOUD RESOURCES

(75) Inventors: Naveen G. Balani, Mumbai (IN);
 Archana Kumar, Bangalore (IN); Vijay K. Sukthankar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 12/797,464

(22) Filed: Jun. 9, 2010

(65) Prior Publication Data

US 2011/0307523 A1    Dec. 15, 2011

(51) Int. Cl.
 *G06F 17/00*    (2006.01)
(52) U.S. Cl.
 USPC ........... 707/790; 707/607; 707/705; 707/813; 707/821
(58) Field of Classification Search
 USPC .......................... 707/607, 705, 790, 813, 821
 See application file for complete search history.

(56) References Cited

U.S. PATENT DOCUMENTS

| 7,177,867 | B2 | 2/2007 | Stringer-Calvert |
| 7,499,968 | B1 | 3/2009 | Alexander |
| 2006/0036633 | A1* | 2/2006 | Chong et al. ................. 707/101 |
| 2006/0074876 | A1 | 4/2006 | Kakivaya |
| 2008/0080396 | A1 | 4/2008 | Meijer |
| 2008/0082490 | A1 | 4/2008 | MacLaurin |
| 2009/0089078 | A1* | 4/2009 | Bursey .............................. 705/1 |
| 2009/0254572 | A1* | 10/2009 | Redlich et al. .................. 707/10 |
| 2010/0217865 | A1* | 8/2010 | Ferris ............................ 709/226 |
| 2010/0250497 | A1* | 9/2010 | Redlich et al. ................ 707/661 |
| 2011/0307290 | A1* | 12/2011 | Rolia et al. ................... 705/7.25 |

FOREIGN PATENT DOCUMENTS

EP    2 107 472    10/2009

* cited by examiner

*Primary Examiner* — Sana Al Hashemi
(74) *Attorney, Agent, or Firm* — The Steadman Law Firm PLLC; Thomas E. Tyson

(57) ABSTRACT

A method, system, and program product for identifying cloud resources are provided, and further a method, system, and program product for configuring cloud resources are provided. The method for identifying cloud resources may include receiving a request with respect to at least one resource in a cloud and determining a set of resources among the at least one resource in the cloud in accordance with the received request. Determining the set of resources may include consulting an ontology including metadata associated with the at least one resource in the cloud and computing the set of resources based on the metadata and the received request. Additionally, the method may include computing a cost factor with respect to the determined set of resources. Furthermore, the method may include rendering, in response to the received request, the determined set of resources and the cost factor with respect to the determined set of resources.

17 Claims, 3 Drawing Sheets

CONFIGURING CLOUD RESOURCES

FIELD OF INVENTION

The various embodiments described herein relate to the field of computers, and specifically to resources in a resource cloud. More particularly, the various embodiments relate to identifying resources, such as computing system resources, and configuring these resources in a resource cloud.

BACKGROUND

Cloud computing is Internet-based computing in which shared resources, software, and information are used by computers and other devices on-demand. It is a paradigm shift following the mainframe and client-server shifts that preceded it. Details are abstracted from the users who no longer have need of, expertise in, or control over the technology infrastructure "in the cloud" that supports them. Cloud computing describes a new supplement, consumption, and delivery model for IT services based on the Internet. Cloud computing typically involves the provision of dynamically scalable and often virtualized resources as a service over the Internet. Cloud computing is a byproduct and consequence of the ease-of-access to remote computing sites provided via the Internet.

SUMMARY

In accordance with aspects of the various embodiments described herein, a method, system, and computer program product for identifying cloud resources are provided. Furthermore, a method, system, and computer program product for configuring cloud resources are provided.

More specifically, in accordance with a first aspect of the various embodiments described herein, a method for identifying cloud resources is provided. The method may comprise receiving a request with respect to at least one resource in a cloud and determining a set of resources among the at least one resource in the cloud in accordance with the received request. The received request may be in the form of a service level agreement (SLA). The at least one resource in the cloud may comprise at least one of an application server, a database, a managing service, a messaging service, and a set of software extensions.

Determining the set of resources in accordance with the method may comprise consulting an ontology (e.g., an ontological database) including metadata associated with the at least one resource in the cloud and computing the set of resources based on the metadata and the received request. The ontology may be stored in a repository, and the metadata associated with the at least one resource may include definition information and instance information. The repository may include at least one of structured data and unstructured data. If the received request is in the form of a SLA, then consulting the ontology may comprise comparing terms in the SLA with terms describing the at least one resource in the cloud. Computing the set of resources in accordance with the method may comprise evaluating relationships among the at least one resource in the cloud. Moreover, computing the set of resources may comprise determining a computing environment in which to service the received request. Furthermore, computing the set of resources may comprise determining at least one of a hardware resource and a software resource with which to service the request.

Additionally, the method may comprise computing a cost factor with respect to the determined set of resources. Computing the cost factor may comprise at least one of (i) computing a cost factor for each of the determined set of resources and (ii) computing a total cost factor with respect to the determined set of resources. Furthermore, the method may comprise rendering, in response to the received request, the determined set of resources and the cost factor computed with respect to the determined set of resources.

In accordance with a second aspect of the various embodiments, a system for identifying cloud resources is provided. The system may comprise at least one processor and at least one memory. The system may be configured for carrying out one or more of the method steps provided above with respect to the first aspect of the various embodiments.

In accordance with a third aspect of the various embodiments, a computer program product for identifying cloud resources is provided. The computer program product may comprise a computer-readable storage medium having computer-readable program code instructions stored therein. Respective instructions among the stored instructions may be directed to one or more of the method steps provided above with respect to the first aspect of the various embodiments.

In accordance with a fourth aspect of the various embodiments described herein, a method for configuring cloud resources is provided. The method may comprise identifying at least one new resource to add to a cloud, wherein the cloud may comprise at least one preexisting resource. The method further may comprise creating an ontology extension for the at least one new resource, wherein the ontology extension may include metadata associated with the at least one new resource. Moreover, the method may comprise creating a relationship between the at least one new resource and the at least one preexisting resource, and storing information regarding the relationship among the metadata included in the ontology extension. Furthermore, the method may comprise storing the ontology extension. Additionally, the method may comprise propagating information with respect to the at least one new resource to the at least one preexisting resource.

In accordance with a fifth aspect of the various embodiments, a system for configuring cloud resources is provided. The system may comprise at least one processor and at least one memory. The system may be configured for carrying out one or more of the method steps provided above with respect to the fourth aspect of the various embodiments.

In accordance with a sixth aspect of the various embodiments, a computer program product for configuring cloud resources is provided. The computer program product may comprise a computer-readable storage medium having computer-readable program code instructions stored therein. Respective instructions among the stored instructions may be directed to one or more of the method steps provided above with respect to the fourth aspect of the various embodiments.

BRIEF DESCRIPTION OF THE DRAWINGS

The above and other objects, features, and advantages of the various embodiments are to be described in further detail herein with reference to the attached drawings, in which.

DETAILED DESCRIPTION

Figure 1:
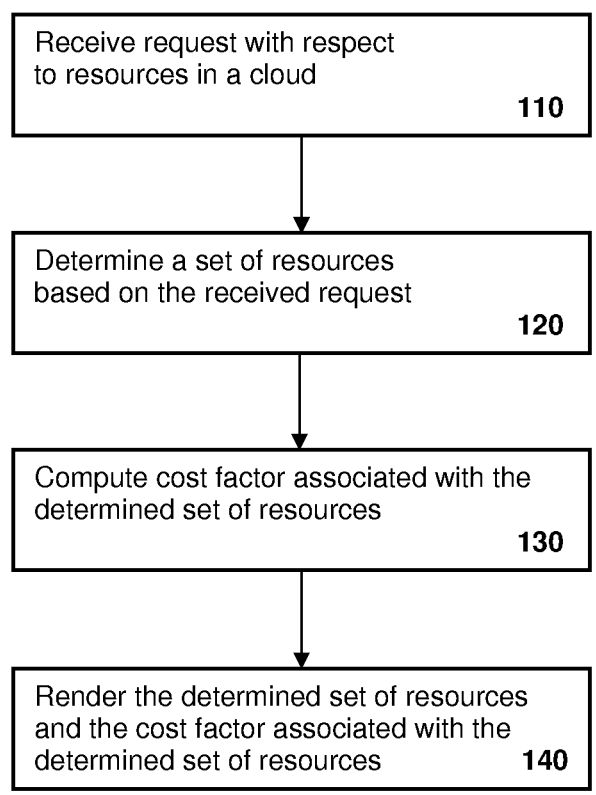
FIG. 1 illustrates a method for determining a set of cloud resources in accordance with an exemplary embodiment.

Reference is now made to FIG. 1, which illustrates a flowchart of a method for determining a set of cloud resources in accordance with an exemplary embodiment. In accordance with the method, a request from a user (i.e., requestor) with respect to at least one resource in a cloud may be received (step 110). In accordance with an embodiment, the request may be in the form of a service level agreement (SLA). The request may comprise specific parameters for determining a set of cloud resources. Based on the received request, a set of cloud resources among the at least one resource in the cloud may be determined (step 120). In accordance with an embodiment, the determined set of resources may include at least one of hardware features and software features.

In accordance with an embodiment, determining a set of cloud resources in response to the received request may be based on a maintained ontology (i.e., knowledge base), which may be a formal representation of cloud resources and relationships between the cloud resources. The ontology may be stored and/or represented in database form, i.e., the ontology may be in the form of an ontological database. In accordance with an embodiment, the ontology may be realized using the W3C Web Ontology Language (OWL). More specifically, the OWL and/or OWL2 specifications may be used. OWL facilitates greater machine interpretability of Internet content by providing additional vocabulary along with formal semantics.

The ontology may include metadata associated with each of the resources in the cloud. The metadata may include a variety of definitions associated with each of the resources. The definition information may include, for each cloud resource, information with respect to name, version, vendor, web container support, portal support, cost factor, etc. Additionally, the definition information may include information with respect to relationships between and/or among resources in the cloud. For example, if a resource is an application server that is part of a cluster, then a relationship between a cluster node and an application server node may exist, and accordingly definition information with respect to such relationship may be included in the relevant ontology definition information. Moreover, the metadata may include instance information with respect to the resources in the cloud. The instance information may include the capabilities supported by each of the resources. Generally, the metadata may include a variety of information, and all such metadata for the purpose of associating and identifying a resource in a cloud falls within the scope of the various embodiments.

Moreover, the ontology may be used to establish hardware and software requirements for each resource in the cloud. Other parameters such as power consumption for each resource with respect to the setup or maintenance of the resource also may be captured in the ontology. Such parameters may be used in determining a cost associated with each resource. A cost associated with using each of the resources in the cloud may be determined. Additionally, the total cost of using some or all of the resources in the cloud may be determined. In accordance with an embodiment, in addition to the set of resources determined in accordance with step 120, a set of parameters (e.g., with respect to power consumption, cost, etc.) may be determined in response to a received request. Computation of cost with respect to the determined set of resources is discussed further herein.

Furthermore, the ontology may be stored in a repository. Such repository may store metadata associated with cloud resources in structured and/or unstructured format. More specifically, the repository may store configurations with respect to the cloud resources and information regarding relationships among the cloud resources. If the ontology is stored in structured format, the structured format may include any format in which data is stored structurally. If the ontology is stored in unstructured format, the unstructured format may include flat files and/or similar formats. In accordance with an embodiment, the ontology may be stored via a combination of structured and unstructured formats.

In view of the foregoing discussion, determining a set of resources in the cloud based on the received request in accordance with step 120 may comprise consulting an ontology including metadata associated with each resource in the cloud. If the received request is in the form of a SLA, consulting the ontology may comprise comparing terms in the SLA with terms describing the at least one resource in the cloud. Moreover, determining a set of resources in the cloud based on the received request in accordance with step 120 may comprise computing a set of resources based on the metadata and the received request. More specifically, in light of the received request and the metadata with respect to the cloud resources, relationships among the cloud resources may be evaluated in order to compute a set of resources. A cloud computing environment in which to service the request may be determined based on the relationships among the cloud resources. Moreover, hardware resources and/or software resources with which to service the request may be determined.

Subsequently, a cost factor may be computed with respect to the determined set of resources (step 130). More specifically, a cost factor for each of the determined set of resources may be computed. Additionally or alternatively, a total cost factor with respect to the determined set of resources may be computed. It is noted that cost is a significant factor with respect to the set of resources determined in accordance with the method. For example, for a given set of resources, the cost associated with power consumption may be high, and accordingly such set of resources may not be advantageous to the user.

Once a determined set of resources is computed along with the cost factor with respect to each of the determined set of resources in accordance with steps 120 and 130, the determined set of resources and the cost factor with respect to each of the determined set of resources may be rendered to the requestor (step 140). In accordance with an embodiment, the determined set of resources may be rendered in an order of ranking.

Figure 2:
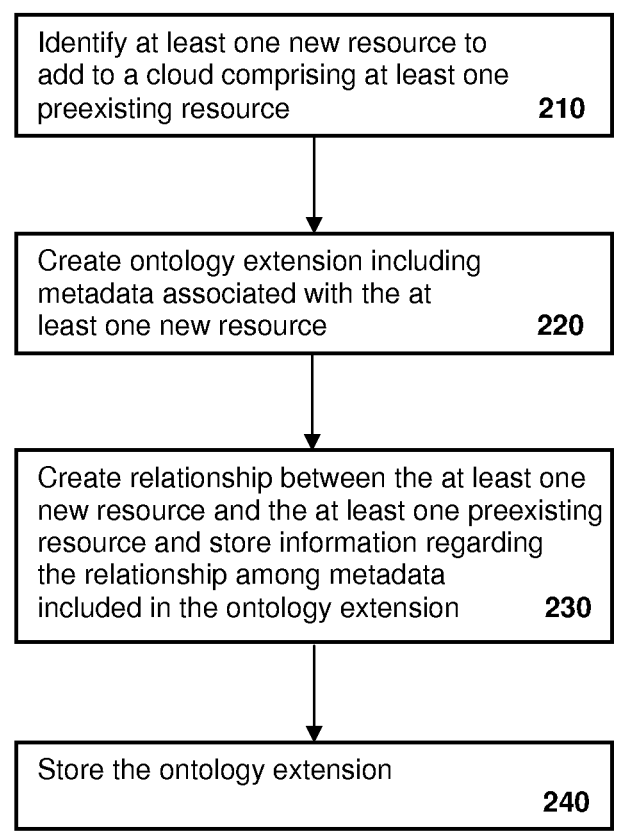
FIG. 2 illustrates a method for associating new resources to a cloud in accordance with an exemplary embodiment.

Reference is now made to FIG. 2, which illustrates a method for associating at least one new resource to a cloud in accordance with an exemplary embodiment. In accordance with the method, at least one new resource may be identified to be added to a cloud comprising at least one preexisting resource (step 210). Such identification may be done manually or may be performed via programming (i.e., without human intervention). Once at least one new resource is identified in accordance with step 210, an ontology extension may be created for the at least one new resource that includes metadata associated with the at least one new resource (step 220). As previously mentioned, OWL may be used to create and/or modify the ontology extension; the use of OWL may enable straightforward addition of the at least one new resource. The metadata with respect to the ontology extension may include at least a variety of definitions associated with each of the at least one new resource. The definition information may include, for each of the at least one new resource, information with respect to name, version, vendor, web container support, portal support, cost factor, etc. Moreover, the metadata may include instance information for each of the at least one new resource. The instance information may include the capabilities supported by each of the at least one new resource.

Once the ontology extension is created for the at least one resource, a relationship may be created between the at least one new resource and the at least one preexisting resource of the cloud, and information regarding such relationship may be stored among the metadata included in the ontology extension (step 230). More specifically, in accordance with an embodiment, such relationship may be in the form of a look up table and may be added to the definition information of the metadata associated with the at least one new resource.

Once such relationship is created, the ontology extension for the at least one new resource may be stored (step 240). More specifically, metadata identified for each of the at least one new resource may be stored in an appropriate format. In accordance with an embodiment, the metadata associated with each of the at least one new resource may be stored in a repository along with the metadata associated with the preexisting cloud resources. The repository may store such metadata in a structured format, an unstructured format, or a combination of structured and unstructured formats.

In accordance with an embodiment, the foregoing method further may comprise propagating information with respect to the at least one new resource to the at least one preexisting resource in the cloud. Such propagated information may be obtained from the ontology extension for the at least one new resource (i.e., from the metadata associated with the at least one new resource).

Figure 3:
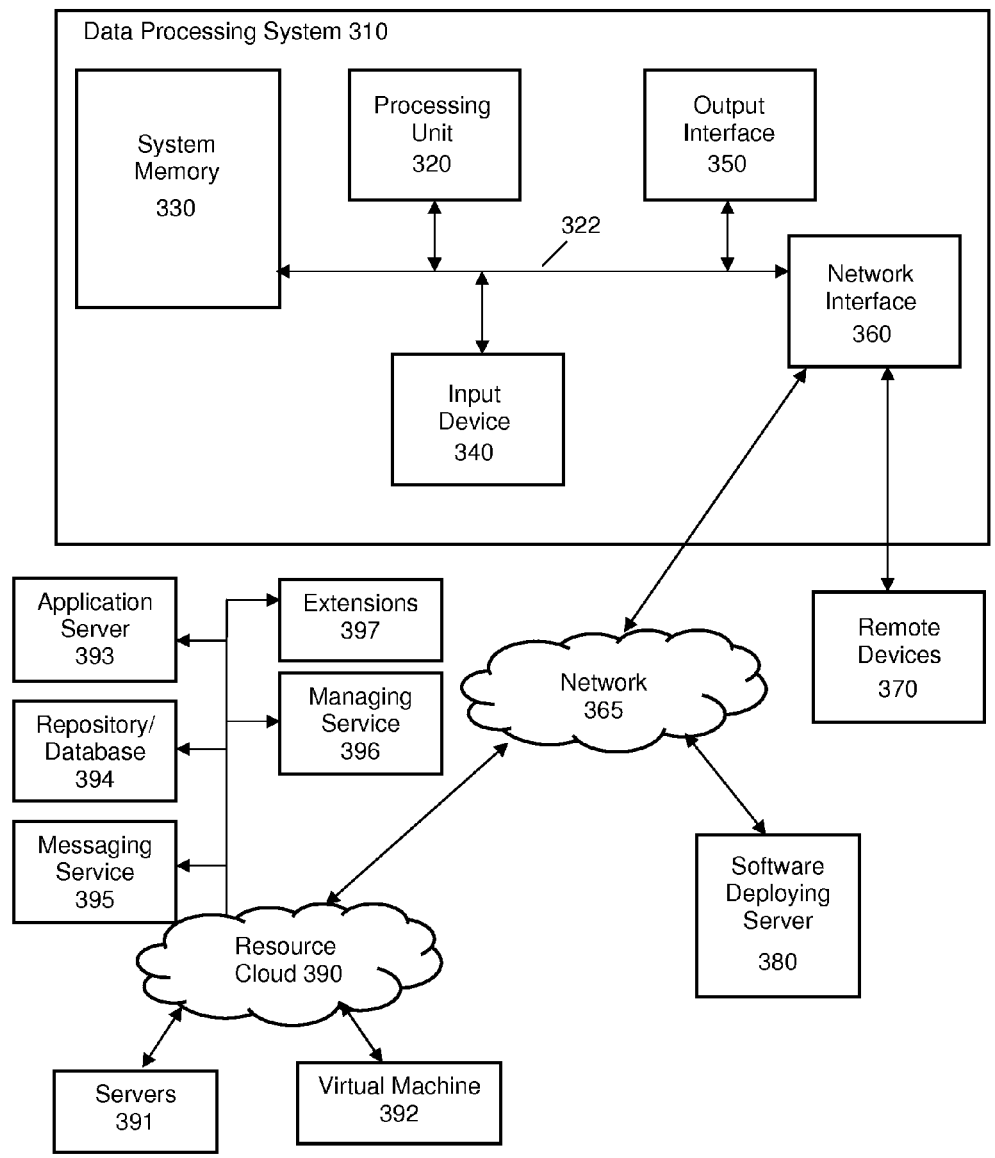
FIG. 3 illustrates a system in which embodiments of the present disclosure may be implemented in accordance with an exemplary embodiment.

It is noted that the various embodiments described herein may be implemented using any of a wide variety of devices and/or systems. Reference is now made to FIG. 3, which provides a data processing system (i.e., computing system) 310. The data processing system 310 is an exemplary system that may be used in implementing one or more of the various embodiments. The data processing system 310 may execute program instructions configured to cluster addresses and may perform other functions of an address cleansing system, as described herein. The data processing system 310 may include servers, desktop computers, laptop computers, and/or portable electronic devices such as PDAs, mobile phones, etc., which may be used as resources in a cloud.

Components of the data processing system 310 may include, but are not limited to, a processing unit 320, a system memory 330, and a system bus 322 for coupling various system components, including the system memory 330, to the processing unit 320. The data processing system 310 may include or have access to a variety of computer readable media. The system memory 330 may include computer readable storage media in the form of volatile and/or nonvolatile memory, such as read only memory (ROM) and/or random access memory (RAM). By way of example, and not limitation, the system memory 330 also may include an operating system, application programs, other program modules, and program data.

A user may interface with (e.g., provide commands and information to) the data processing system 310 via at least one input device 340. A monitor or other type of device also may be connected to the system bus 322 via an interface such as an output interface 350. In addition to a monitor, computers may be operatively coupled to other peripheral output devices. The data processing system 310 may operate in a networked or distributed environment using logical connections to one or more other remote computing systems or databases, such as databases storing raw addresses. The logical connections may include a network 365 such a local area network (LAN) or a wide area network (WAN). The data processing system 310 may be connected to the network 365 via a network interface 360. In accordance with an embodiment, the network 365 may be connected to a software deploying server 380. The functionality of the software deploying server 380 is further described herein. Additionally, the logical connections may include other networks/buses. Furthermore, in accordance with an embodiment, the data processing system 310 may be connected to one or more remote devices 370.

Furthermore, the data processing system 310 may be coupled to a resource cloud 390 having at least one processor, memory resources (e.g., system memory and/or secondary mass storage memory), and other resources (e.g., operating systems, network connections, etc.) available for use by a cloud resources configuring computing system when configuring real and/or virtual resources such as a plurality of servers 391 and/or a plurality of virtual machines (VMs) 392.

In accordance with an embodiment, the resources configured in accordance with one or more of the methods described herein may be configured to satisfy a service level agreement (SLA), which is a level of ability/service (i.e., the capacity of cloud hardware and/or software) that is contractually guaranteed by a resource provider. An exemplary cloud resource located in the resources cloud 390 may include at least one of the following: at least one application server 393 (which may be real or virtual), at least one repository/database 394 (either stored on a physical storage device or distributed across a virtual storage network), at least one messaging service 395 (e.g., e-mail service), at least one managing service 396, and a plurality of extensions 397 (wherein the extensions may be in the form of software enabling a user to modify existing commands in order to create new commands).

As mentioned above, the system memory 330 of the data processing system 310 may comprise an operating system. The operating system may include a shell for providing transparent user access to resources that run on the data processing system 310, such as application programs included in the system memory 330. Generally, the shell may be a program that provides an interpreter and an interface between the user and the operating system. More specifically, the shell may execute commands entered into a command line user interface or from a file. Thus, the shell also may be called a command processor. The shell generally may be the highest level of the operating system software hierarchy and may serve as a command interpreter. The shell may provide a system prompt, may interpret commands entered by keyboard, mouse, or other user input media, and may send the interpreted commands to the appropriate lower levels of the operating system (e.g., a kernel) for processing. Note that while the shell is a text-based, line-oriented user interface, other user interface modes, such as graphical, voice, gestural, etc. are contemplated within the scope of the present disclosure.

Additionally, the operating system may include a kernel, which includes lower levels of functionality for the operating system. Such lower levels of functionality may include providing essential services required by other parts of the operating system and application programs, including memory management, process and task management, disk management, and mouse and keyboard management.

Application programs that may be included in and/or processed by the system memory 330 may comprise a renderer. A browser is an example of such renderer. The browser may include program modules and instructions enabling a world wide web (WWW) client (in this context, the data processing system 310) to send and receive network messages to the Internet using hypertext transfer protocol (HTTP) messaging, thus enabling communication with the software deploying server 380 and other described computer systems.

In accordance with an embodiment, application programs in the system memory 330 of the data processing system 310

(as well as the system memory of the software deploying server 380) also may include a cloud resource configuration program, which may be an ontology-based program. Such cloud resource configuration program may include code for implementing the methods described with reference to FIGS. 1 and 2. In accordance with an embodiment, the data processing system 310 may download a cloud resource configuration program from the software deploying server 380 via the network 365 and the network interface 360. The cloud resource configuration program may be downloaded at runtime and/or "on-demand", i.e., according to the immediate needs of the data processing system 310.

In accordance with an embodiment, the software deploying server 380 may perform all of the functions associated with the present disclosure (including execution of the cloud resource configuration program). In accordance with such embodiment, the data processing system 310 need not use its internal computing resources to execute the cloud resource configuration program.

Note that a "set of cloud resources" as described herein may be a set of multiple cloud resources. Alternatively, a "set of cloud resources" as described herein may be a single cloud resource, such as a virtual application server, a database (virtual or real), a messaging service, an extension to a set of software instructions, etc. In accordance with an embodiment, the cost factor associated with each resource can be used for metering capability and charging of resources in a cloud computing environment. Such cost factor, which may be relevant with respect to a SLA, also may be described in the ontological database, allowing different SLA terms to be cross-integrated across different cloud resources. Similarly, the ontological database may be used in comparing the terms in the SLA with terms describing the configured set of cloud resources in order to determine a set of cloud resources in accordance with the SLA parameters.

It is noted that semantic web concepts (e.g., an ontological repository) may be used to compute interoperability between or among cloud computing resources in order to determine whether a plurality of resources can be integrated to provide a solution. For example, a new application server added to a resource cloud may be discovered and may be added to application clusters that support that a specific version of application server. Furthermore, performance runtime and actual performance runtime capability may be used to determine which resource or resources are being utilized in a cloud computing environment and whether such resource or resources are meeting the requirements of a relevant SLA.

The various embodiments described herein may be implemented as a system, method, or computer program product. Accordingly, aspects of the various embodiments may assume the form of an entirely hardware embodiment, an entirely software embodiment (including firmware, resident software, micro-code, etc.), or an embodiment combining software and hardware aspects that generally may all be referred to herein as a "circuit," "module," or "system." Furthermore, aspects of the various embodiments may assume the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, but is not limited to, an electronic, magnetic, optical, electromagnetic, infrared, or semiconductor system, apparatus, or device, or may be any suitable combination of the foregoing. More specifically, a non-exhaustive list of computer readable storage mediums includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Furthermore, a computer readable storage medium may be any tangible medium that can include or store a program for use by or in connection with an instruction execution system, apparatus, or device.

A computer readable signal medium may include a propagated data signal with computer readable program code embodied therein, for example, in baseband or as part of a carrier wave. Such a propagated signal may assume any of a variety of forms, including but not limited to electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted via any appropriate medium, including but not limited to wireless, wireline, optical fiber cable, RF, etc., or any suitable combination of the foregoing.

Computer program code for carrying out operations with respect to aspects of the various embodiments may be written in any combination of one or more programming languages, including an object oriented programming language such as Java™, Smalltalk, C++, or the like and conventional procedural programming languages such as the "C" programming language or similar programming languages. The program code may execute entirely on a user's computing device, as a stand-alone software package, partly on the user's computing device and partly on a remote computer or server, or entirely on the remote computer or server. In the latter scenarios, the remote computer or server may be connected to the user's computing device via any type of network, including a local area network (LAN) or a wide area network (WAN), or a connection may be made to an external computer (e.g., via the Internet using an Internet Service Provider).

Aspects of the various embodiments are described herein with reference to flowchart illustrations and/or block diagrams of methods, apparatus (systems), and computer program products in accordance with exemplary embodiments. It is noted that each block of the flowchart illustrations and/or block diagrams, and combinations of blocks in the flowchart illustrations and/or block diagrams, may be implemented by computer program instructions. These instructions may be provided to a processor of a general purpose computer, special purpose computer, or other programmable data processing apparatus to produce a machine, such that the instructions, which may execute via the processor of the computer or other programmable data processing apparatus, may be used to implement the functions/acts specified in the flowchart and/or block diagram blocks.

Moreover, the computer program instructions may be stored in a computer readable medium that may direct a computer, other programmable data processing apparatus, or other devices to function in a particular manner, such that the instructions stored in the computer readable medium may produce an article of manufacture including instructions that implement the functions/acts specified in the flowchart and/or block diagram blocks.

Furthermore, the computer program instructions may be loaded onto a computer, other programmable data processing apparatus, or other devices to cause a series of operational steps to be performed on the computer, other programmable apparatus, or other devices. Accordingly, a computer-implemented process may be produced such that the instructions that execute on the computer or other programmable apparatus may provide processes for implementing the functions/acts specified in the flowchart and/or block diagram blocks.

The flowcharts and block diagrams in the figures illustrate the architecture, functionality, and operation of possible implementations of systems, methods, and computer program products according to exemplary embodiments. In this regard, each block in the flowchart or block diagrams may represent a module, segment, or portion of code that comprises one or more executable instructions for implementing the specified logical function(s). It is noted that, in some alternative implementations, the functions noted in the blocks may occur out of the order noted in the figures. For example, two blocks shown in succession may, in fact, be executed substantially concurrently, or the blocks may be executed in the reverse order, depending upon the functionality involved. Also, it is noted that each block of the block diagrams and/or flowcharts, and combinations of blocks in the block diagrams and/or flowcharts, may be implemented by special purpose hardware-based systems that perform the specified functions or acts, or by combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are presented here for purposes of illustration and description, but these exemplary embodiments are not intended to be exhaustive or limiting. Many modifications and variations will be apparent to those of ordinary skill in the art. The exemplary embodiments were chosen and described in order to explain principles and practical application, and to enable others of ordinary skill in the art to understand the disclosure for various embodiments with various modifications as are suited to the particular use contemplated. That is to say, it is to be understood that the various embodiments are not limited to the described exemplary embodiments, and that various other changes and modifications may be affected therein by one skilled in the art without departing from the scope or spirit of the disclosure.

Having thus described the various embodiments by reference to illustrative exemplary embodiments thereof, it will be apparent that modifications and variations are possible without departing from the scope of the disclosure defined in the appended claims.

What is claimed is:

1. A method comprising:
    receiving a request with respect to at least one resource in a cloud, wherein the received request is in the form of a service level agreement;
    determining a set of resources among the at least one resource in the cloud in accordance with the received request, wherein determining the set of resources comprises:
        consulting an ontology including metadata associated with the at least one resource in the cloud, wherein consulting the ontology comprises comparing terms in the service level agreement with terms describing the at least one resource in the cloud; and
        computing the set of resources based on the metadata and the received request, wherein computing the set of resources comprises evaluating relationships among the at least one resource in the cloud;
    computing a cost factor with respect to the determined set of resources; and
    rendering the determined set of resources and the cost factor with respect to the determined set of resources.

2. A computer program product comprising a computer-readable storage medium having computer-readable program code instructions stored therein comprising:
    a first set of instructions for receiving a request with respect to at least one resource in a cloud, wherein the received request is in the form of a service level agreement;
    a second set of instructions for determining a set of resources among the at least one resource in the cloud in accordance with the received request, wherein the second set of instructions comprises:
        a third set of instructions for consulting an ontology including metadata associated with the at least one resource in the cloud, wherein consulting the ontology comprises comparing terms in the service level agreement with terms describing the at least one resource in the cloud; and
        a fourth set of instructions for computing the set of resources based on the metadata and the received request, wherein computing the set of resources comprises evaluating relationships among the at least one resource in the cloud;
    a fifth set of instructions for computing a cost factor with respect to the determined set of resources; and
    a sixth set of instructions for rendering the determined set of resources and the cost factor with respect to the determined set of resources.

3. A system comprising:
    a processor; and
    a memory storing a program, which, when executed on the processor, performs an operation comprising:
        receiving a request with respect to at least one resource in a cloud, wherein the received request is in the form of a service level agreement;
        determining a set of resources among the at least one resource in the cloud in accordance with the received request, wherein determining the set of resources comprises:
            consulting an ontology including metadata associated with the at least one resource in the cloud, wherein consulting the ontology comprises comparing terms in the service level agreement with terms describing the at least one resource in the cloud; and
            computing the set of resources based on the metadata and the received request, wherein computing the set of resources comprises evaluating relationships among the at least one resource in the cloud;
        computing a cost factor with respect to the determined set of resources; and
        rendering the determined set of resources and the cost factor with respect to the determined set of resources.

4. The method of claim 1, wherein the ontology is stored in a repository, and wherein the metadata includes definition information and instance information.

5. The method of claim 1, wherein computing the set of resources comprises determining a computing environment in which to service the received request.

6. The method of claim 1, wherein computing the set of resources comprises determining at least one of a hardware resource and a software resource with which to service the received request.

7. The method of claim 1, wherein computing the cost factor with respect to the determined set of resources comprises at least one of computing a cost factor for each of the determined set of resources and computing a total cost factor with respect to the determined set of resources.

8. The method of claim 1, wherein the at least one resource in the cloud comprises at least one of an application server, a database, a managing service, a messaging service, and a set of software extensions.

9. The computer program product of claim 2, wherein the ontology is stored in a repository, and wherein the metadata includes definition information and instance information.

10. The computer program product of claim 2, wherein the fourth set of instructions comprises a seventh set of instructions for determining a computing environment in which to service the received request.

11. The computer program product of claim 2, wherein the fourth set of instructions comprises an eighth set of instructions for determining at least one of a hardware resource and a software resource with which to service the received request.

12. The computer program product of claim 2, wherein the fifth set of instructions comprises at least one of a ninth set of instructions for computing a cost factor for each of the determined set of resources and a tenth set of instructions for computing a total cost factor with respect to the determined set of resources.

13. The computer program product of claim 2, wherein the at least one resource in the cloud comprises at least one of an application server, a database, a managing service, a messaging service, and a set of software extensions.

14. The system of claim 3, wherein the ontology is stored in a repository, and wherein the metadata includes definition information and instance information.

15. The system of claim 3, wherein computing the cost factor with respect to the determined set of resources comprises at least one of computing a cost factor for each of the determined set of resources and computing a total cost factor with respect to the determined set of resources.

16. The method of claim 4, wherein the repository includes at least one of structured data and unstructured data.

17. The computer program product of claim 9, wherein the repository includes at least one of structured data and unstructured data.

* * * * *